US010634068B2

(12) United States Patent
Chaves et al.

(10) Patent No.: US 10,634,068 B2
(45) Date of Patent: Apr. 28, 2020

(54) METHOD AND DEVICE FOR CONTROLLING THE ENGINE BRAKING OPERATION IN INTERNAL COMBUSTION ENGINES

(71) Applicants: Rodrigo Chaves, Penedo-Resende-RJ (BR); Gottfried Raab, Perg (AT); Markus Raup, Attnang-Puchheim (AT); Lukas Gohm, Steyr (AT)

(72) Inventors: Rodrigo Chaves, Penedo-Resende-RJ (BR); Gottfried Raab, Perg (AT); Markus Raup, Attnang-Puchheim (AT); Lukas Gohm, Steyr (AT)

(73) Assignee: MAN Truck & Bus Österreich AG, Steyr (AT)

( * ) Notice: Subject to any disclaimer, the term of this patent is extended or adjusted under 35 U.S.C. 154(b) by 368 days.

(21) Appl. No.: 13/854,268

(22) Filed: Apr. 1, 2013

(65) Prior Publication Data

US 2013/0255624 A1 Oct. 3, 2013

(30) Foreign Application Priority Data

Apr. 2, 2012 (AT) .................................. A 397/2012

(51) Int. Cl.
*F02D 13/04* (2006.01)
*F02D 41/00* (2006.01)
(Continued)

(52) U.S. Cl.
CPC ......... *F02D 13/04* (2013.01); *F02D 41/0055* (2013.01); *F02D 9/06* (2013.01);
(Continued)

(58) Field of Classification Search
USPC ........................................ 123/321, 322, 323
See application file for complete search history.

(56) References Cited

U.S. PATENT DOCUMENTS 4,787,044 A 11/1988 Nagata
6,283,091 B1 * 9/2001 Bartel et al. .................. 123/322
(Continued)

FOREIGN PATENT DOCUMENTS

CN 101956611 1/2011
DE 19847388 4/2000
(Continued)

OTHER PUBLICATIONS

Machine Translation of JP58096158A PDF File Name: "JP58096158A_Machine_Translation.pdf".*

(Continued)

*Primary Examiner* — Phutthiwat Wongwian
*Assistant Examiner* — Ruben Picon-Feliciano
(74) *Attorney, Agent, or Firm* — Cozen O'Connor

(57) ABSTRACT

A method and a device for controlling the engine braking operation in internal combustion engines for motor vehicles, wherein the internal combustion engine is operated with direct injection of fuel and a controllable brake flap is provided in the exhaust gas system for retaining exhaust gases in the engine braking operation, and moreover has an exhaust gas recirculation device having an EGR valve that is arranged upstream of the brake flap and a recirculation line that connects the exhaust gas system to the intake system of the internal combustion engine and during the driving operation controls a defined quantity of recirculated exhaust gas with respect to the combustion air. To avoid critical excessive temperatures at the injection valves, in the engine braking operation (MB), the EGR valve (13) is more or less opened in dependence upon operating parameters (n, $T_E$) of the internal combustion engine (1).

15 Claims, 2 Drawing Sheets

(51) Int. Cl.
*F02D 31/00* (2006.01)
*F02D 9/06* (2006.01)
*F02D 41/12* (2006.01)

(52) U.S. Cl.
CPC .......... *F02D 31/001* (2013.01); *F02D 41/123* (2013.01); *F02D 2200/101* (2013.01); *Y02T 10/47* (2013.01)

(56) References Cited

U.S. PATENT DOCUMENTS

| | | | |
|---|---|---|---|
| 2003/0178002 A1* | 9/2003 | Israel et al. | 123/321 |
| 2009/0178390 A1* | 7/2009 | Yahata | F02D 9/02 60/285 |
| 2011/0011081 A1 | 1/2011 | Quigley | |
| 2012/0017868 A1* | 1/2012 | Rammer | F01L 13/06 123/323 |
| 2012/0017869 A1* | 1/2012 | Rammer et al. | 123/323 |

FOREIGN PATENT DOCUMENTS

| | | | |
|---|---|---|---|
| JP | 58096158 A * | 6/1983 | F02M 26/57 |
| JP | 2001280173 | 10/2001 | |
| WO | WO 99/24732 | 5/1999 | |
| WO | WO 02/18761 | 3/2002 | |

OTHER PUBLICATIONS

Chinese Patent Office Action dated May 27, 2016 in corresponding Chinese patent application No. 2013101119600.
Search Report dated Sep. 15, 2016 which issued in the corresponding European Patent Application No. 16001212.6.

* cited by examiner

METHOD AND DEVICE FOR CONTROLLING THE ENGINE BRAKING OPERATION IN INTERNAL COMBUSTION ENGINES

BACKGROUND OF THE INVENTION

1. Field of the Invention

The present invention relates to a method for controlling the engine braking operation in internal combustion engines in motor vehicles and to a device for performing this method.

2. Background of the Invention

In the case of highly compressed internal combustion engines having a brake flap in the exhaust gas system it is possible in the overrun mode (engine braking operation) for high temperatures to occur in the combustion chambers, which high temperatures could possibly be damaging for the injection valves of the direct injection system. It is known from DE 198 47 388 B4 to inject fuel in order to cool the injection valves even in the engine braking operation.

SUMMARY OF THE INVENTION

It is an object of the invention is to provide a method by which it is possible without additional structural costs to counteract any overheating in particular of the injection valves. In addition, an advantageous device for performing the method is also disclosed.

It is proposed in accordance with the invention that in the engine braking operation the EGR [exhaust gas recirculation] valve of the exhaust gas recirculation device is more or less opened in a defined and/or predetermined manner in dependence upon at least one defined operating parameter of the internal combustion engine. It has surprisingly been shown that consequently the critical temperatures at the injection valves can be avoided, wherein the engine braking performance is slightly reduced. In so doing, it is to be regarded as being particularly advantageous that in the case of an existing exhaust gas recirculation device it is only necessary to change the software in an existing control device, as a consequence of which the method can likewise also be easily retrofitted in existing internal combustion engines.

In a particularly simple implementation of an embodiment of the invention, the EGR valve can be more or less opened in a defined and/or predetermined manner in dependence upon the rotational speed of the internal combustion engine in the engine braking operation, in particular in such a manner that different rotational speeds or different rotational speed ranges are allocated different opening degrees of the EGR valve during the engine braking operation. For example, in the case of an EGR flap embodied as an EGR valve, it is possible in the case of a first high rotational speed to predetermine a greater opening angle than is predetermined in the case of a comparatively lower rotational speed. The gradual adjustment of the opening degree can be performed in this case, for example, in a linear manner but also in steps. Consequently, it is relatively simple to make an adjustment to suit the respective occurring exhaust gas mass flows and pressure conditions with a preferred higher braking performance in the lower rotational speed range and with a comparatively lower braking performance in the higher rotational speed range of the internal combustion engine.

As an alternative or in addition thereto, the EGR valve can be more or less opened in a defined and/or predetermined manner in dependence upon the preferably respective current predetermined and/or determined and/or sensed temperature of the injection nozzles of the direct injection system in the engine braking operation, in particular in such a manner that different temperatures or temperature ranges of the injection nozzles are also allocated different opening degrees of the EGR valve and/or upon achieving a predetermined temperature threshold the EGR valve is fully opened. For example, it can be provided that from the start of the engine braking operation the opening gradient of the EGR valve increases with the rising temperature of the injection nozzles until upon achieving a defined threshold temperature the EGR valve is fully opened and remains so for a predetermined period of time.

In order to achieve a highest possible braking performance in the case of a commencing engine braking operation, the EGR valve can, in addition, be opened only with a time delay, in other words, after a defined time interval starting from the closing of the brake flap. Consequently, the temperature inertia of the injection nozzles is used for a full braking performance up to the point in which the critical temperature threshold occurs and only then is the EGR valve opened. Fundamentally, the EGR valve can, however, also be opened immediately at the commencement of the engine braking operation.

In a particularly advantageous embodiment of the invention, the opening of the EGR valve can be controlled by a combination of several defined and/or predetermined operating parameters of the internal combustion engine in such a manner that a defined rotational speed of the internal combustion engine is maintained in the engine braking operation. Consequently, a speed control of the motor vehicle is achieved in the overrun mode within limits by way of the EGR valve, in that (for example superimposed with respect to the temperature control) the engine braking operation is controlled in such a manner that a defined rotational speed that is set for example by way of a control system is maintained. In so doing, the braking performance can also be reduced by way of the EGR valve even if the set speed and/or the rotational speed of the internal combustion engine is to be maintained.

In addition, it is possible in a manner known per se in the engine braking operation by way of direct injection system to convey a defined quantity of fuel as an auxiliary injection, wherein this measure can be embodied in order to achieve a higher braking performance and/or to reduce the temperature at the injection nozzles.

In practice, any control system, for example a control device and/or a control device combination can be provided in order to perform the method, by means of which inter alia the EGR valve of the exhaust gas recirculation device is controlled. It is possible in the engine braking operation to superimpose an engine braking operation mode on the control device and/or by means of the control device, which engine braking mode controls the opening of the EGR valve at least in response to signals from a rotational speed sensor and/or temperature sensors and the closing of the brake flap in the exhaust gas system.

Temperature values of the internal combustion engine and/or of the injection valves and/or of the intake air can be transmitted to the control device as a temperature signal, wherein, for example, it is possible to provide that the EGR valve can only be opened once a defined temperature threshold has been achieved. The temperature values can be taken from temperature models and/or characteristic curves and/or from equivalent variables, such as the rotational speed, and/or are fundamentally also sensed by means of temperature sensors.

Finally, the internal combustion engine can be operated in a manner known per se using exhaust gas turbo-charging, wherein the brake flap is positioned upstream or downstream of the exhaust gas turbine, but downstream of the branching recirculation line in the exhaust gas recirculation device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is described in detail hereinunder with reference to the accompanying, schematic drawing, in which.

DETAILED DESCRIPTION OF THE PRESENTLY PREFERRED EMBODIMENTS

Figure 1:
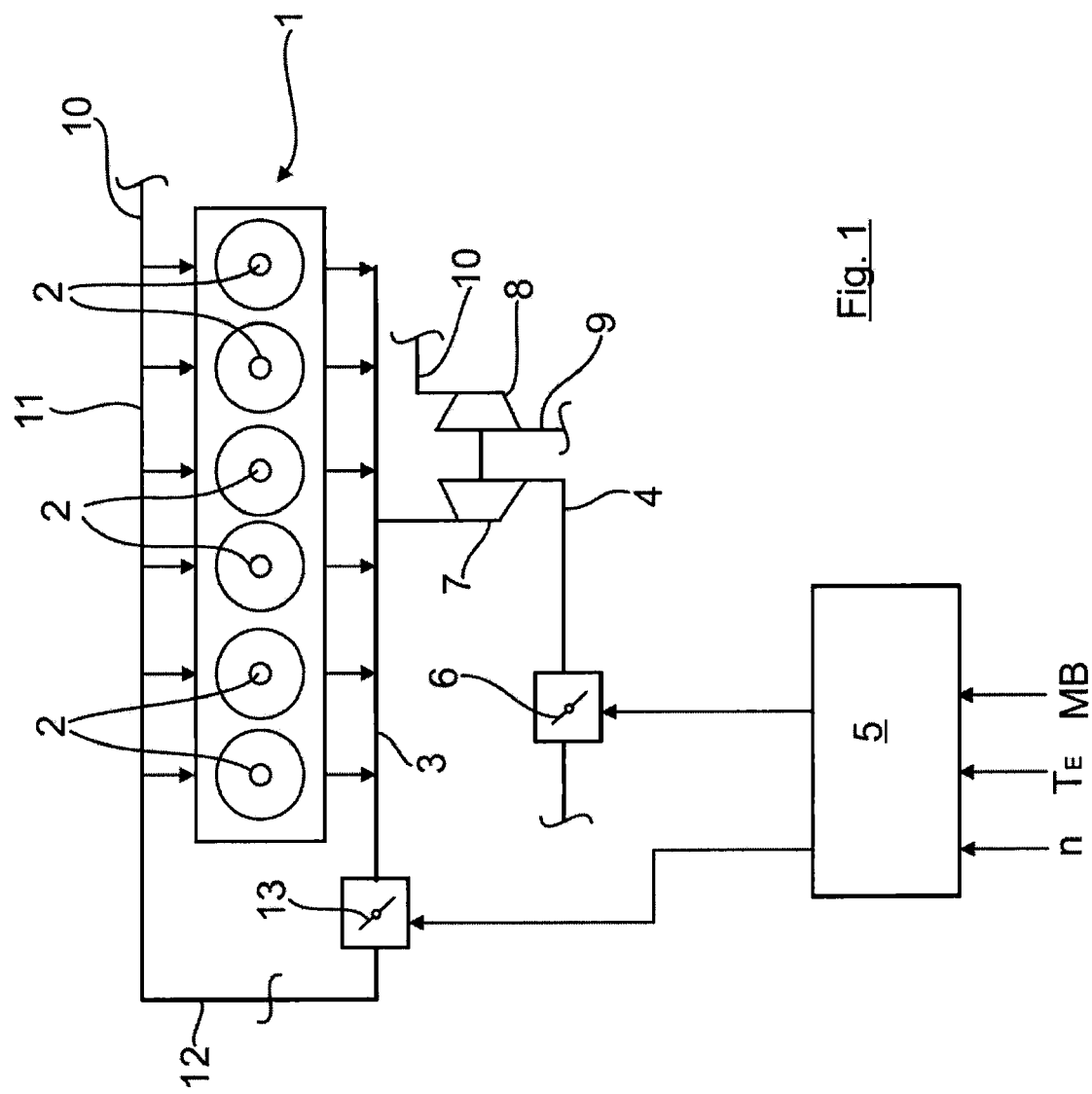
FIG. 1 shows a schematic diagram of a multi-cylinder in-line internal combustion engine having exhaust gas turbo-charging and an exhaust gas recirculation device and having a brake flap that is arranged in the exhaust gas system to control an engine braking operation.

FIG. 1 illustrates an internal combustion engine 1 (e.g. a diesel engine) having in this case only by way of example six cylinders and a direct fuel injection system in its combustion chambers by way of injection valves 2 that are only indicated schematically.

The internal combustion engine 1 comprises an only partially illustrated exhaust gas system having an exhaust gas manifold 3 and an exhaust gas line 4. A brake flap 6 that can be controlled by way of an electronic control device 5 is installed in the exhaust gas line 4.

The internal combustion engine 1 is operated with exhaust gas turbo-charging, wherein the exhaust gas turbocharger is integrated with its exhaust gas turbine 7 into the exhaust gas line 4.

The compressor 8 of the exhaust gas turbocharger draws in combustion air by way of an inlet line 9 that is only indicated schematically and conveys said intake air by way of a manifold pressure line 10 and an intake distributor 11 to the combustion chambers of the internal combustion engine 1.

An exhaust gas recirculation line 12 is provided between the exhaust gas manifold 3 and the intake distributor 11 and an exhaust gas recirculation (EGR) valve 13 is installed in said exhaust gas line adjacent to an exhaust gas cooler (not illustrated). The EGR valve 13 is controlled in accordance with operating data of the internal combustion engine 1 by way of the control device 5. The EGR valve 13 can, for example, be any shut-off and/or restricting element, that is opened, for example, by a proportional valve.

The injection nozzles 2 are connected to a fuel injection device (for example common rail) and in the direct injection method inject the quantity of fuel determined by way of the control device 5. It goes without saying that unless otherwise described the internal combustion engine and its operating devices can be of a conventional structure and design.

The regular engine braking operation is, for example, activated by way of a foot pedal (not illustrated), wherein a signal MB is transmitted to the control device 5 and the control device opens and/or closes the brake flap 6. In so doing, the EGR valve 13 is closed in the regular engine braking operation and the fuel injection is interrupted.

In addition to numerous operating parameters, the rotational speed n of the internal combustion engine 1 is derived in the control device 5 by means of a rotational speed sensor and, for example, model-based or from equivalent variables; or the temperature signals $T_E$ are transmitted by way of a temperature sensor arranged on one of the injection valves 2.

Software having an engine braking operation mode is superimposed on the control device 5 and the engine braking operation mode in the case of an activated engine braking operation and closed brake flap 6 more or less opens the EGR valve 13 gradually and/or continuously in dependence upon the predetermined temperature $T_E$ of the injection valves 2 and/or in dependence upon the current rotational speed n of the internal combustion engine 1 and in addition controls an auxiliary injection of fuel by way of the injection valves 2.

If a defined temperature threshold is achieved at the injection valves 2 and/or a defined engine rotational speed n is present in the engine braking operation, then after a defined time interval (short full engine braking performance) has elapsed the EGR valve 13 is opened, as a consequence of which exhaust gas is recirculated by way of the recirculation line 12 and the exhaust gas counter pressure upstream of the exhaust gas flap 13 is reduced together with the related reduction in engine braking performance. At the same time, the auxiliary injection of fuel can be controlled in advance or delayed by way of the injection valves 2 in order to provide their additional cooling.

Figure 2:
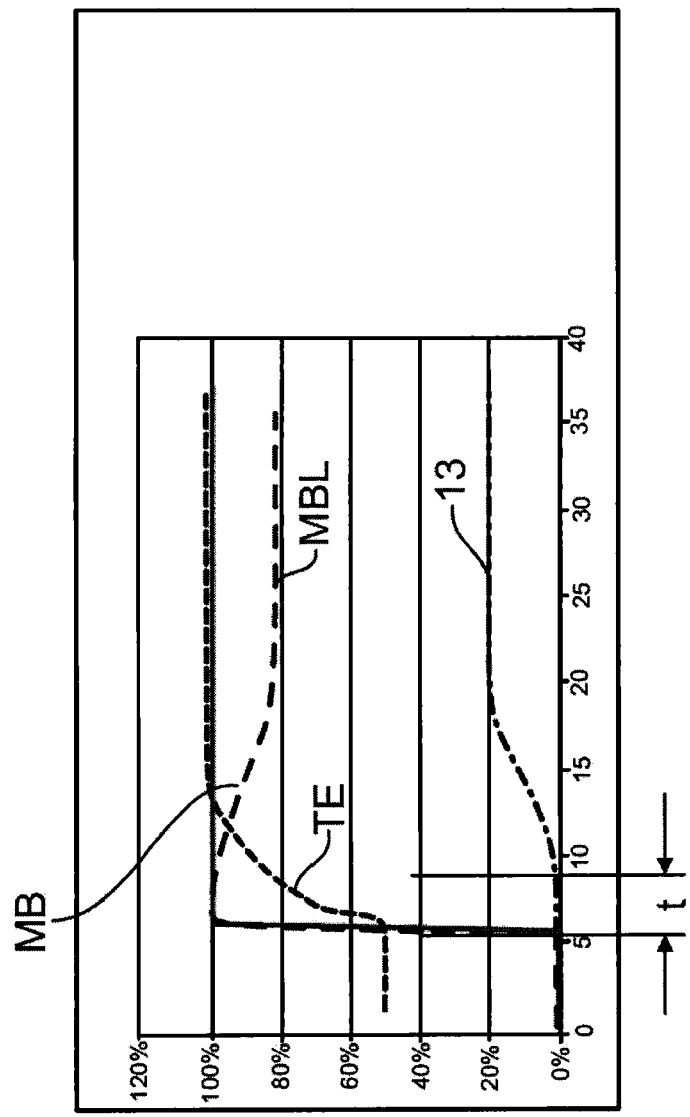
FIG. 2 shows a graph illustrating the engine braking operation, the current braking performance and the temperature curve at the injection valves of the internal combustion engine influenced by the opening of the EGR valve of the exhaust gas recirculation device.

The graph in accordance with FIG. 2 shows, for example, the influence of the exhaust gas recirculation in the engine braking operation on the temperature $T_E$ of the injection valves 2, as a consequence of which damaging excessive temperatures can be avoided at this site.

The broken line MB describes the state of the brake flap 6 that is closed starting at 0% to 100% by means of the signal MB in order to trigger the engine braking operation.

The dashed line $T_E$ indicates the subsequent rise in temperature of the injection nozzles 2, wherein a time interval t can elapse prior to the EGR valve 13 being opened further, as illustrated by the dash-dot line 13.

The opening of the EGR valve 13 effects a reduction in the engine braking performance in accordance with line MBL and at the same results in no further increase in the temperature $T_E$.

As detailed, the opening of the EGR valve 13 is also influenced by the rotational speed n of the internal combustion engine, so that, for example, it can be provided that the EGR valve 13 is further opened as the rotational speed n increases (not illustrated in the graph) and the associated exhaust gas counter pressure is further reduced or is also maintained constant.

It is also possible by way of the described opening of the EGR valve 13 to effect within a limited scope a rotational speed control operation and/or speed control operation of the motor vehicle in the overrun mode by way of the control device 5, wherein said control device that is coupled to a control system (not illustrated) maintains a set engine rotational speed n by virtue of the fact that the EGR valve 13 is more or less opened in a defined amount.

It goes without saying that in so doing the temperature threshold at the injection valves 2 takes precedence and upon achieving the temperature threshold the control function is interrupted.

When the engine braking operation is terminated by way of the signal MB and by opening the brake flap 6, the EGR valve 13 is simultaneously initially closed prior to the regular operation of the internal combustion engine 1 being re-actuated by way of the control device 5.

The invention is not limited to the described exemplary embodiment.

Consequently, in a simplified embodiment, it is possible also to use only the rotational speed signals n in conjunction, if necessary, with an auxiliary injection in order to avoid critical excessive temperatures at the injection valves 2 in the engine braking operation.

The exhaust gas turbo-charging can, if necessary, also be performed by way of register charging with a low pressure exhaust gas turbocharger and a high pressure exhaust gas turbocharger; if necessary, it is also possible not to provide exhaust gas turbo-charging of the internal combustion engine.

Additional parameters for controlling the EGR valve 13 of the exhaust gas recirculation device can be sensors for the exhaust gas counter pressure upstream of the exhaust gas flap 6, the exhaust gas temperature, the cylinder inlet temperature, the temperature of the internal combustion engine, etc. Some of these parameters are already readily available in conventional control devices 5 and can be correspondingly evaluated.

The control device 5 can be fundamentally an engine control device, however, an electronic control device that is independent of the engine control device and has the described inputs n, MB, TE, etc. is preferred.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of controlling an engine braking operation in internal combustion engines for motor vehicles, wherein the internal combustion engine is operated with direct injection of the fuel by injection nozzles and a controllable brake flap is provided in an exhaust gas system in order to retain the exhaust gases in the engine braking operation, has an exhaust gas recirculation device having an exhaust gas recirculation (EGR) valve arranged upstream of the brake flap, and has a recirculation line that connects the exhaust gas system to an intake system of the internal combustion engine and that, during a driving operation, controls a defined quantity of recirculated exhaust gas with respect to combustion air, whereby the brake flap is installed in an exhaust gas line said method comprising an electronic control device: in the engine braking operation, a temperature control in which the EGR valve is opened in one of a defined and predetermined manner in dependence upon a temperature of the injection nozzles of the direct injection system, and wherein the opening of the EGR valve is controlled by a combination of a plurality of one of predetermined and defined operating parameters of the internal combustion engine such that a rotational speed control of the motor vehicle in an overrun mode is achieved wherein said control device that is coupled to a control system maintains a set engine rotational speed by virtue of the fact that the EGR valve is more or less opened in a defined amount; and wherein the temperature control takes precedence over the rotational speed control and upon achieving a temperature threshold the control function of the rotational speed control is interrupted in order to avoid temperatures of the injection nozzles exceed the temperature threshold.

2. The method according to claim 1, wherein the EGR valve is also opened in one of a defined and predetermined manner in dependence upon the rotational speed of the internal combustion engine in the engine braking operation.

3. The method according to claim 2, wherein different rotational speeds or different rotational speed ranges of the engine braking operation phase are allocated different opening degrees of the EGR valve.

4. The method according to claim 1, wherein the EGR valve is also opened time-delayed after a defined time interval starting from a closing of the brake flap.

5. The method according to claim 1, further comprising the step of injecting, in the engine braking operation, a defined quantity of fuel as an auxiliary injection by way of the direct injection system.

6. The method according to claim 1, further comprising the step of providing an engine braking operation mode to an electronic control device in the engine braking operation, said engine braking operation mode controlling the opening of the EGR valve at least in further dependence upon one of a rotational speed signal, a temperature signal and the closing of the brake flap in the exhaust gas system.

7. The method according to claim 6, further comprising the step of transmitting to the electronic control device determined and/or sensed temperature values of one of the internal combustion engine, of the injection nozzles and of intake air, wherein the electronic control device further controls the opening of the EGR valve in dependence upon the determined and/or sensed temperature values of one of the internal combustion engine, and of intake air.

8. The method according to claim 6, further comprising the steps of:
   operating the internal combustion engine with exhaust gas turbo-charging; and
   positioning the brake flap one of upstream and downstream of the exhaust gas turbine but downstream of the branching recirculation line of the exhaust gas recirculation device.

9. The method of claim 1, wherein the EGR valve is opened in dependence of one of the current predetermined, determined and sensed temperature of the injection nozzles.

10. The method of claim 9, wherein one of different temperature or temperature ranges of the injection nozzles are allocated different opening degrees of the EGR valve and upon achieving a defined temperature the EGR valve is fully opened.

11. The method of claim 1, wherein one of different temperature or temperature ranges of the injection nozzles are allocated different opening degrees of the EGR valve, and, upon achieving a defined temperature, the EGR valve is fully opened.

12. The method of claim 1, wherein different temperatures or temperature ranges of the injection nozzles are allocated different degrees of opening of the EGR valve.

13. A device for controlling an engine braking operation in an internal combustion engine for motor vehicles operated with a direct injection system having injection nozzles, comprising: a controllable brake flap disposed in an exhaust gas system and installed in an exhaust gas line; an exhaust gas recirculation device comprising a recirculation line and an EGR valve arranged upstream of said brake flap, said recirculation line connecting the exhaust gas system to an intake system of the internal combustion engine; and an electronic control device, wherein said EGR valve is coupled to said electronic control device such that a temperature control is achieved in which said EGR valve is opened in the engine braking operation in one of a defined and predetermined manner in dependence upon a temperature of the injection nozzles of the direct injection system of the internal combustion engine, and wherein the opening of the EGR valve is controlled by a combination of a plurality of one of predetermined and defined operating parameters of the internal combustion engine such that a rotational speed control of the motor vehicle in an overrun mode is achieved wherein said control device that is coupled to a control system maintains a set engine rotational speed by virtue of the fact that the EGR valve is more or less opened in a defined amount; and wherein the temperature control takes precedence over the rotational speed control and upon achieving a temperature threshold the control function of the rotational speed control is interrupted in order to avoid temperatures of the injection nozzles exceed the temperature threshold.

14. The device of claim 13, wherein different temperatures or temperature ranges of the injection nozzles are allocated different degrees of opening of the EGR valve.

15. A device for controlling the engine braking operation in an internal combustion engine for motor vehicles operated with a direct injection system having injection nozzles, comprising: a controllable brake flap disposed in an exhaust gas system and installed in an exhaust gas line; an exhaust gas recirculation device comprising a recirculation line and an EGR valve arranged upstream of said brake flap, said recirculation line connecting the exhaust gas system to an intake system of the internal combustion engine; and an electronic control device, wherein said EGR valve is coupled to said electronic control device such that a temperature control is achieved in which control of an opening of said EGR valve is controlled by a combination of a plurality of one of predetermined and defined operating parameters of the internal combustion engine including a temperature of the injection nozzles such that a rotational speed control of the motor vehicle in an overrun mode is achieved wherein said control device that is coupled to a control system maintains a set engine rotational speed by virtue of the fact that the EGR valve is more or less opened in a defined amount; and wherein the temperature control takes precedence over the rotational speed control and upon achieving a temperature threshold the control function of the rotational speed control is interrupted in order to avoid temperatures of the injection nozzles exceed the temperature threshold; wherein different temperatures or temperature ranges of the injection nozzles are allocated different degrees of opening of the EGR valve.

\* \* \* \* \*